US007744261B2

(12) United States Patent
Fukawa et al.

(10) Patent No.: US 7,744,261 B2

(45) Date of Patent: Jun. 29, 2010

(54) VEHICLE LIGHTING SYSTEM

(75) Inventors: Kiyotaka Fukawa, Shizuoka (JP); Naohisa Tatara, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 259 days.

(21) Appl. No.: 11/594,661

(22) Filed: Nov. 7, 2006

(65) Prior Publication Data

US 2007/0103923 A1 May 10, 2007

(30) Foreign Application Priority Data

Nov. 8, 2005 (JP) ......................... P. 2005-323082

(51) Int. Cl.
*B60Q 3/04* (2006.01)

(52) U.S. Cl. ........................ 362/543; 362/545; 362/544; 362/459; 362/475; 362/487; 362/507; 362/508

(58) Field of Classification Search ................. 362/543, 362/545, 459, 475, 487, 507, 508, 544
See application file for complete search history.

(56) References Cited

U.S. PATENT DOCUMENTS

| | | | | |
|---|---|---|---|---|
| 6,406,172 | B1 | 6/2002 | Harbers et al. | |
| 6,953,273 | B2 * | 10/2005 | Nakajima et al. | 362/517 |
| 7,008,093 | B2 | 3/2006 | Fukawa et al. | |
| 7,081,708 | B2 * | 7/2006 | Ito et al. | 315/82 |
| 7,534,020 | B2 | 5/2009 | Moisel | |
| 2003/0174493 | A1 * | 9/2003 | Kinouchi | 362/43 |
| 2004/0202006 | A1 * | 10/2004 | Pien | 362/545 |

FOREIGN PATENT DOCUMENTS

| | | | |
|---|---|---|---|
| DE | 10205779 | A1 | 10/2003 |
| DE | 10245296 | B3 | 5/2004 |
| DE | 10261183 | B3 | 6/2004 |
| EP | 1526328 | A2 | 4/2005 |
| JP | 2004-327187 | | 11/2004 |
| JP | 2005-11608 | | 1/2005 |

OTHER PUBLICATIONS

German Office Action dated Sep. 11, 2009 in Appln. No. 10 2006 052 749.6.

* cited by examiner

*Primary Examiner*—Sandra L O'Shea
*Assistant Examiner*—Jessica L McMillan
(74) *Attorney, Agent, or Firm*—Fish & Richardson P.C.

(57) ABSTRACT

A vehicle lighting system includes a plurality of lamps having their own inherent respective light distribution characteristics. The plurality of lamps includes a first lamp to irradiate an area excluding a nearest field area just in front of a vehicle, and a second lamp which irradiates only the nearest field area. The plurality of lamps are operable to be simultaneously or selectively lit, and are operable so that irradiation lights of the lamps are combined so as to obtain a particular light distribution characteristic in accordance with various driving conditions of a vehicle.

10 Claims, 11 Drawing Sheets

VEHICLE LIGHTING SYSTEM

BACKGROUND

The present application claims priority from Japanese patent application no. 2005-323082, filed on Nov. 8, 2005, the content of which is incorporated herein by reference.

The present disclosure relates to a lighting system of a vehicle such as a motor vehicle, and more particularly to an vehicle lighting system which can obtain a light distribution characteristic effective for safe driving in various driving conditions by selectively lighting a plurality of lamps.

The light distribution characteristics of a headlamp of a motor vehicle sometimes are controlled according to the driving conditions of the motor vehicle so as to secure safe driving. For example, when the vehicle is running with a dipped beam or low beam on, the light irradiated toward the right of the vehicle is shielded in order not to interfere with the vision of the driver of an oncoming vehicle. Alternatively, when running in rainy weather, the light distribution characteristics of the vehicle's headlamps are controlled to reduce the brightness in a nearest field area just in front of the vehicle so as to prevent light irradiated from the headlamps of the vehicle being reflected on the road surface and interfering with the vision of the driver of an oncoming vehicle. To implement such control, a shade incorporated in a projector-type lamp which forms a headlamp can be moved to shield or reduce the light emitted from a light source, so as to reduce the brightness in a right-forward area of the vehicle or to reduce the brightness in the nearest field area just in front of the vehicle. In other cases, an independent second shade is provided. By moving this second shade, part of the light is shielded so as to reduce the brightness in a nearest field area just in front of the vehicle.

In the foregoing techniques, part of the light emitted from the light source in the headlamp is shielded or reduced by the shade in order to reduce the brightness in the right front area or the nearest field area just in front of the vehicle. As a result, light that is so shielded or reduced is wasted, and the irradiation efficiency of the headlamp (i.e., the level of brightness in an area irradiated by the headlamp relative to electric power supplied thereto) is reduced. Therefore, it is difficult to reduce the size of the lighting system and the amount of consumed power, which reduces the fuel economy of the motor vehicle. In addition, the use of a movable shade that moves in and out of the optical path to change the irradiation area tends to be complex, which increases the production costs of the headlamp.

SUMMARY

The present disclosure relates to a vehicle lighting system which, in some cases, can obviate the need for a movable shade so as to reduce the production costs, while obtaining a light distribution characteristic that is effective in realizing safe running of the vehicle without reducing the irradiation efficiency by shielding or reducing the light emitted from a light source by a light shielding means.

In one aspect of the invention, a vehicle lighting system includes lamps having their own inherent light distribution characteristics for selectively lighting the plurality of lamps and combining irradiation lights of the lamps to obtain a desired light distribution characteristic. The lighting system includes a lamp for irradiating an area excluding a nearest field area just in front of a vehicle and a lamp for irradiating only the nearest field area. In some cases, the "lamp for irradiating only the nearest field area" may irradiate part of the irradiation area of the "lamp for irradiating an area excluding a nearest field area just in front of a vehicle" in an overlapping fashion in a peripheral area of the nearest field area when irradiating the nearest field area.

The lamp for irradiating only the nearest field may be constructed to irradiate the nearest field area by reducing the light that it irradiates. In addition, the lamp for irradiating the area excluding the nearest field area may include, for example, a discharge lamp or a semiconductor light emitting device as a light source, and the lamp for irradiating only the nearest field area may include, for example, a lamp which utilizes a semiconductor light emitting device as a light source.

One or more of the following advantages may be present in some implementations. For example, the lighting system can be set to proper light distribution characteristics suitable for various driving conditions of the vehicle by lighting the lamps simultaneously or selectively, so as to irradiate the areas on the surface of a road ahead of the vehicle for safe driving. In addition, since each lamp does not have to be provided with a light shielding means having a movable construction for shielding the light emitted from the light source, the construction of the lamp can be simplified, thereby making it possible to reduce production costs. In recent years, it has been well-accepted to improve the visibility of the driver by swiveling a lamp horizontally. By adopting a configuration in which an important area in terms of light distribution is irradiated by the lamp for irradiating the area excluding the nearest field area and an auxiliary irradiation is implemented by the lamp for irradiating only the nearest field area (for example, in order to increase the visibility on a curved path), only the former lamp may be swiveled to irradiate the area excluding the nearest field area on the path. That can simplify a swiveling construction for the entire lighting system.

In addition, since one of the lamps irradiates the area excluding the nearest field area just in front of the vehicle while the other lamp irradiates only the nearest field area just in front of the vehicle, during normal driving, both lamps are lit to irradiate the area ahead of the vehicle in a preferred fashion. On the other hand, during rainy weather, the lamp for irradiating only the nearest field area can be switched off or the light irradiating from that lamp can be reduced so as to reduce the brightness in the nearest field area just in front of the vehicle. Thus, the glare to an oncoming vehicle caused by light reflected from a wet road surface in the nearest field area can be prevented. In this case, since the shielding of the light on each lamp can be suppressed to a minimum level, the waste of light from the light source can be reduced, which can help reduce the amount of consumed power. In addition, when the lamp for irradiating the area excluding the nearest field area includes a lamp which utilizes a discharge lamp as a light source, and the lamp for irradiating the nearest filed area includes a lamp which utilizes a semiconductor light emitting device as a light source, the life of the lamp for the nearest field area is not affected even in the event that the lamp is switched on and off or operated repeatedly at frequent intervals to reduce the light output. Also, although both lamps are lit simultaneously, since the color temperatures of the discharge lamp and the semiconductor light emitting device are the same, the driver does not sense any physical disorder. Furthermore, as the nearest field area can be irradiated by the lamp which utilizes the semiconductor light emitting device as the light source and which can be lit quickly, that lamp can remain lit until the discharge lamp, which turns on more slowly, is turned on and is stable. Therefore, safety during the initial stage of lighting the lamps can be increased.

DETAILED DESCRIPTION

Embodiment 1

Figure 1:
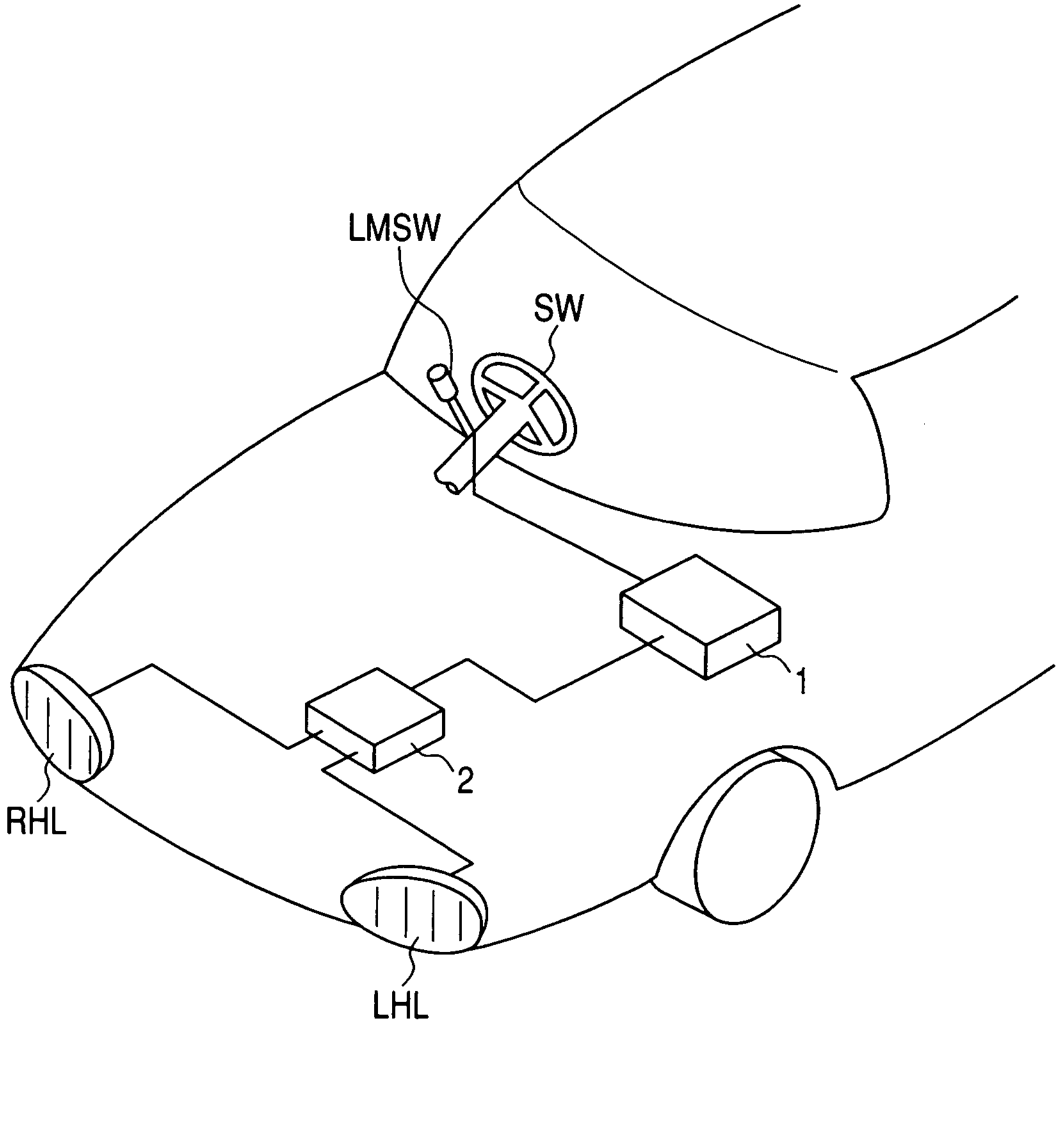
FIG. 1 is a conceptual diagram which shows an example of an overall configuration of an vehicle lighting system of the invention.

FIG. 1 is a schematic diagram showing an embodiment in which the invention is applied to a lighting system which includes a pair of headlamps provided at left and right front portions of a motor vehicle. When a driver in the driver's seat of a motor vehicle CAR operates a lamp mode selector switch LMSW provided in the vicinity of the steering wheel SW to change lamp modes, a central processor unit (CPU) 1 controls a lamp control unit 2 so as to control respective light distribution characteristics, that is, light distribution patterns of left and right headlamps LHL, RHL by the lamp control unit 2. Lamp modes that can be selected include a "driving-under-the-rainy-weather mode (wet road mode)" and a "high speed driving mode (middle beam mode) in addition to a "driving mode (high beam mode)" and a "pass-by mode (low beam mode).

Figure 2:
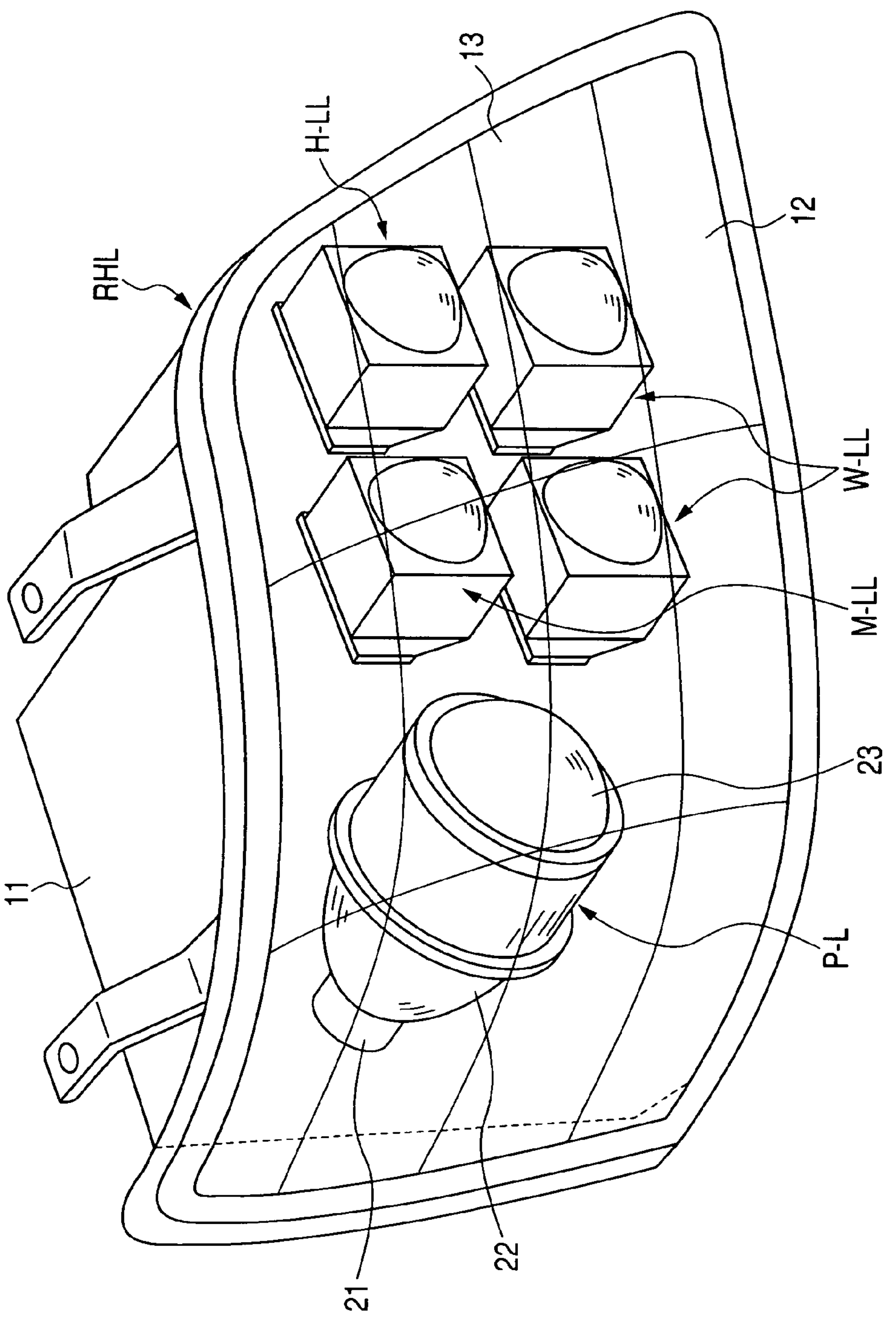
FIG. 2 is a schematic perspective view of a right headlamp of Embodiment 1.

The left and right headlamps LHL, RHL have the same configuration as one another. FIG. 2 shows the right headlamp RHL. First to fourth lamps are installed within a lamp compartment 13 which is defined by a lamp body 11 and a transparent cover 12 which is mounted in a front opening in the lamp body 11.

Figure 3A:
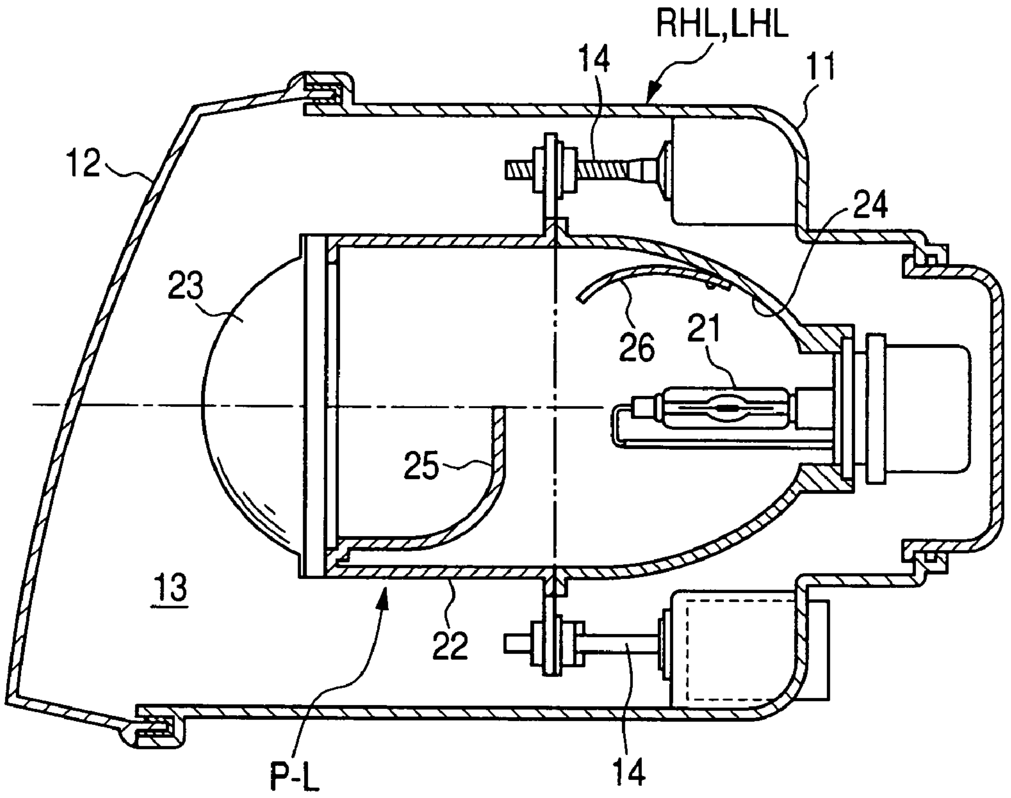
FIG. 3A is a sectional view of a projector-type lamp.
Figure 3B:
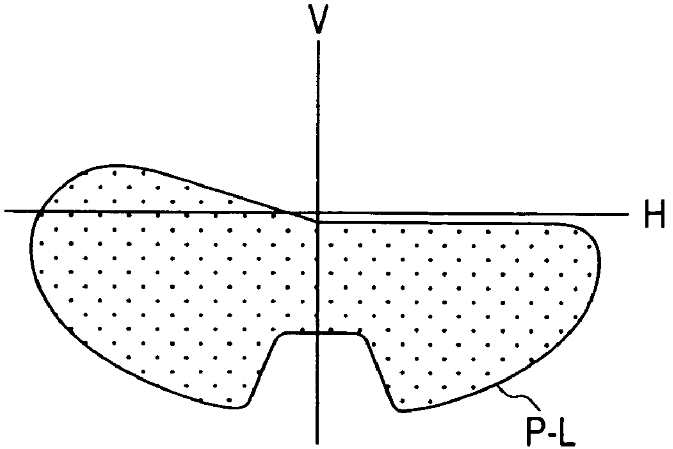
FIG. 3B is a light distribution characteristic diagram of the projector-type lamp shown in FIG. 3A.

As shown in FIG. 3A, a first lamp includes a projector-type discharge lamp P-L. The first lamp P-L includes a discharge lamp 21 as a light source, a lamp housing 22 which houses the discharge lamp 21, and a lens 23 on a front side of the lamp housing 22. The lamp housing 22 includes a reflector 24 which is formed into an ellipsoid of revolution, whereby light irradiated from the discharge lamp 21 and light reflected by the reflector 24 are collected so as to be irradiated ahead of the vehicle. In addition, the lamp housing 22 is configured to include a cut-off line forming shade 25 for cutting off light irradiated upwards in an area lying further rightward than an optical axis and causing light to be irradiated upwards in an area lying further leftward than the optical axis and an auxiliary reflector 26 for reflecting light which irradiates a nearest field area just in front of the subject vehicle towards the other area. This auxiliary reflector 26 can be provided integrally with or separately from the reflector 24. This first lamp P-L is supported within the lamp compartment 13 by means of an aiming mechanism 14 or the like. In this first lamp P-L, its light distribution characteristic is, as shown in FIG. 3B, set to a light distribution characteristic in which a wide area ahead of the subject vehicle is irradiated so that the light does not interfere with the vision of a driver of the other vehicle (e.g., an oncoming vehicle) as it would be by a conventional-dipped beam (low beam) of a motor vehicle. An approximately trapezoidal area lying in a nearest field area just in front of the vehicle is not irradiated. In the figure, symbols or reference characters V and H denote a vertical line and a horizontal line, respectively, which pass through an optical axis directed in a direction in which the vehicle travels. As has been described before, no light is irradiated to the nearest field area just in front of the vehicle. This results in a light distribution characteristic in which the nearest filed area is not irradiated. Although the first lamp P-L includes the shade 25 and the auxiliary reflector 26 which are constructed to be fixed in this way, a movable shade is not required.

Figure 4A:
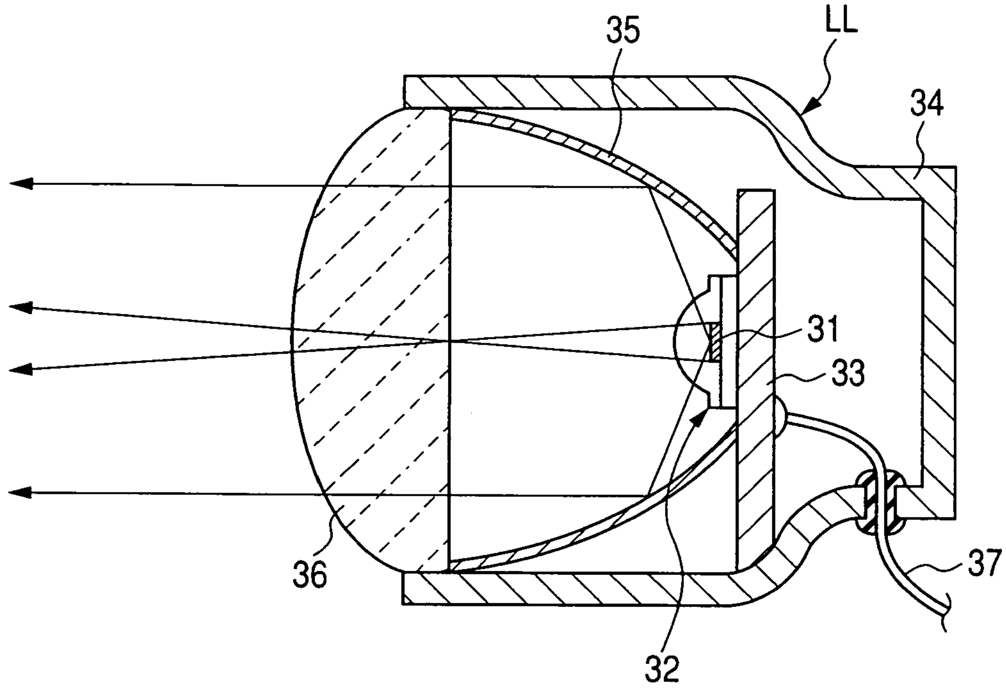
FIG. 4A is a sectional view of an LED lamp.
Figure 4B:
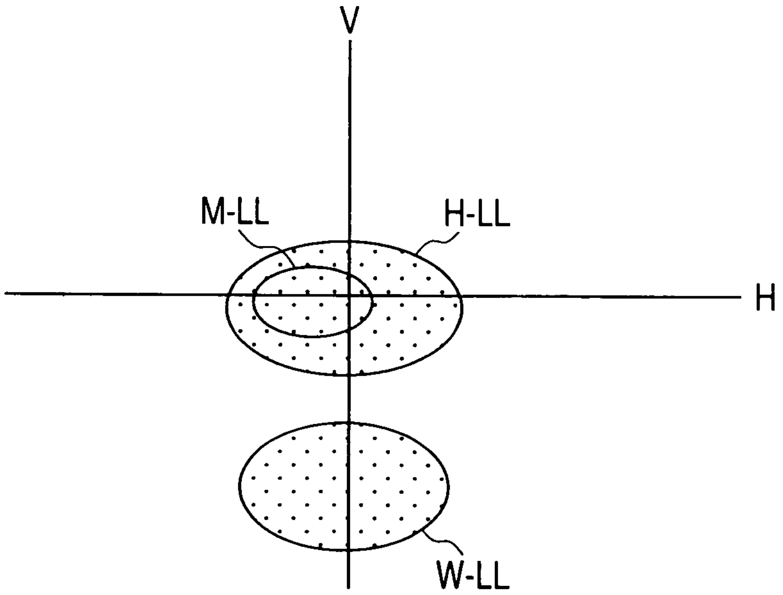
FIG. 4B is a light distribution characteristic diagram of the LED lamp shown in FIG. 4A.

As is shown in FIG. 2, second to fourth lamps are composed of four LED lamps LL. The configurations of the individual LED lamp LL are almost the same. As is shown in FIG. 4A, an LED module 32, in which an LED (light emitting diode) 31 is sealed by a transparent resin lens, is used as a light source. The LED module 32 is supported within a lamp housing 34 by a support plate 33. In addition, a reflector 35 having a reflecting surface configuration is installed within the lamp housing 34, and a lens 36 is provided in a front opening in the lamp housing 34. Reference numeral 37 denotes an electric cord for supplying the LED 31 with electric current. In this LED lamp LL, light emitted from the LED module 32 is directly corrected by the lens 36 or reflected by the reflector 35 to be collected by the lens 36, and then is irradiated forward of the motor vehicle. The reflector 35 and the lens 36 are designed into the required shapes, whereby a light distribution characteristic of the LED lamp LL irradiates a range relatively narrower than the range irradiated by the first lamp P-L. In the second to fourth four LED lamps LL, as is shown in the light distribution characteristics diagram in FIG. 4B, an LED lamp (as the second lamp) which irradiates a nearest field area just in front of the subject vehicle is designated as W (wet road)-LED lamps and denoted by reference character W-LL. As the third lamp, an LED lamp which irradiates a far field area in a straight-line traveling direction of the subject vehicle is designated as a H (high beam)-LED lamp and denoted by reference character H-LL. As the fourth lamp, an LED lamp which irradiates a forward area in the straight-line traveling direction of the subject vehicle is designated as a M (middle beam)-LED lamp and denoted by reference character M-LL. The second lamp W-LL is illustrated as being made up of two LED lamps, whereas the H-LED lamp H-LL and M-LED lamp M-LL are illustrated as being made up of a single lamp, respectively.

Figure 5A:
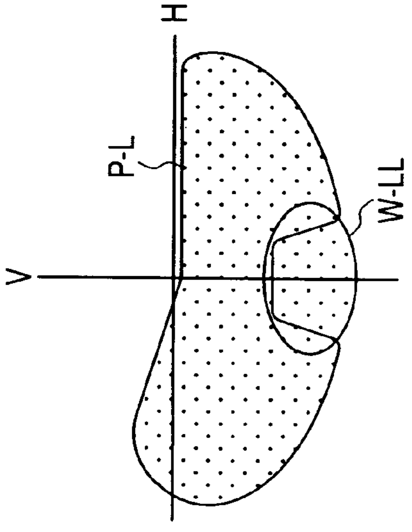
FIGS. 5A to 5D are light distribution characteristic diagrams showing light distribution characteristics according to various driving conditions in Embodiment 1.

Next, the light distribution characteristic of each lamp mode in Embodiment 1 will be described. The first lamp P-L functions as the "lamp for irradiating an area excluding a nearest field area just in front of the vehicle," and the second lamps W-LL function as the "lamp for irradiating only the nearest field area." In the configuration of the headlamps in Embodiment 1, when the driver switches the lamp mode selector switch LMSW to the "pass-by mode," the first lamps P-L and the second lamps W-LL of the left and right headlamps LHL, RHL are lit. FIG. 5A shows the resulting light distribution characteristic in which a forward wide area ahead of the vehicle (excluding the nearest field area thereof) is irradiated by the first lamps P-L. The nearest field area just in front of the subject vehicle is irradiated by the second lamps W-LL. In this light distribution characteristic, respective irradiation lights of the first lamps P-L and the second lamps W-LL are combined together so as to irradiate all of the direct forward area to a left forward area of the vehicle. The forward wide area lying ahead of the vehicle is irradiated without interfering with the vision of the driver of an oncoming vehicle so as to secure the safe driving.

Figure 5B:
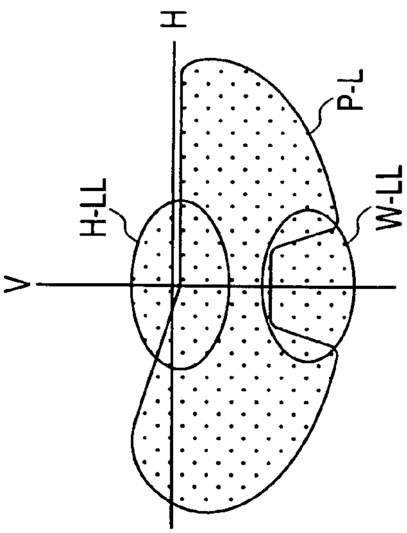

When the driver switches the lamp mode selector switch LMSW to the "driving mode," the first lamps P-L, the second lamps W-LL and the third lamps H-LL of the left and right headlamps LHL, RHL are lit. FIG. 5B shows the resulting light distribution characteristic in which the forward wide area (excluding the nearest field area just in front of the vehicle) is irradiated by the first lamps P-L. The nearest field area just in front of the vehicle is irradiated by the second lamps W-LL, and a right forward area of the vehicle is irradiated by the third lamps H-LL. In this light distribution characteristic, irradiation lights of the first to third lamps are combined together so as to irradiate the forward to far field areas. The forward wide area ahead of the vehicle, and as far as the far field area, is irradiated so as to secure safe driving.

Figure 5C:
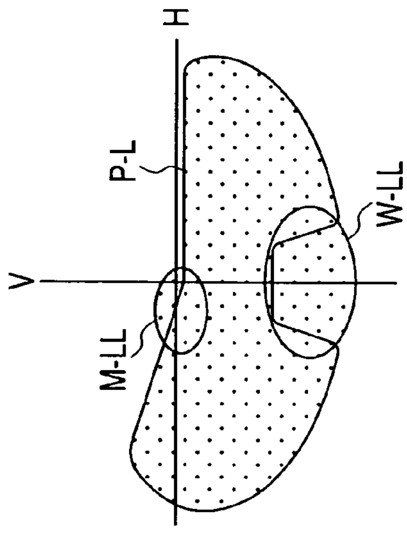

When the driver switches the lamp mode selector switch LMSW to the "high speed driving mode," the first lamps P-L, the second lamps W-LL and the fourth lamps M-LL of the left and right headlamps LHL, RHL are lit. FIG. 5C shows the resulting light distribution characteristic in which the forward wide area ahead of the vehicle (excluding the nearest field area just in front thereof) is irradiated by the first lamps P-L. The nearest field area just in front of the vehicle is irradiated by the second lamps W-LL, and the left forward area of the vehicle is irradiated by the fourth lamps M-LL. In this light distribution characteristic, respective irradiation lights of the first, second and fourth lamps are combined together so as to irradiate all of the direct forward area to a left forward far field area of the subject vehicle. Safe driving is secured without interfering with the vision of the driver of an oncoming vehicle when driving the subject vehicle at relatively high speeds. As this occurs, the second lamps W-LL may be lit such that the amount of light from those lamps is reduced, thereby resulting in power savings Visibility in the far field area also can be increased.

Figure 5D:
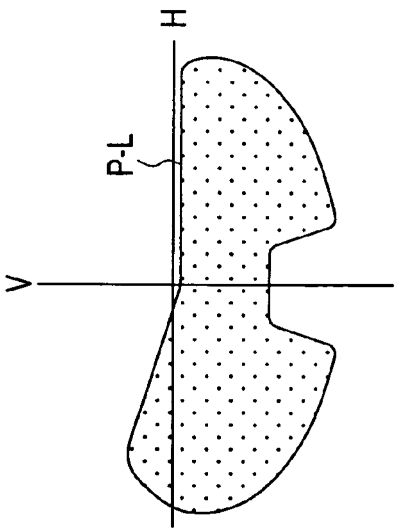

When the driver switches the lamp mode selector switch LMSW to the "driving-under-the-rainy-weather mode," only the first lamps P-L of the left and right headlamps LHL, RHL are lit. FIG. 5D shows the resulting light distribution characteristic, in which the forward wide area (excluding the nearest field area just in front of the vehicle) is irradiated. In this light distribution characteristic, the forward area of the vehicle (excluding the nearest field area just in front of the vehicle) is irradiated by only the first lamps P-L. Consequently, since the nearest field area is not irradiated while the forward area of the vehicle is irradiated, light from the headlamps of the vehicle is not reflected on the wet road surface in the nearest field area just in front of the vehicle. That can help avoid interfering with the vision of the driver of an oncoming vehicle. The second lamps W-LL may be lit so that the light irradiating from them is reduced, depending on the brightness in the surrounding environment. As the nearest field area just in front of the subject vehicle is irradiated with low luminous intensity, safe driving in the nearest field area is secured. In addition, the fourth lamps M-LL may be lit when the speed of the subject vehicle is increased so as to irradiate the left forward far field area of the subject vehicle.

A suitable light distribution characteristic for each of the different driving modes can be obtained by combining the respective irradiation lights of the first to fourth lamps into an integrated light beam pattern. In addition, as the individual lamps are designed to irradiate the predetermined areas when lit, the need to shield light from the light source can be reduced and, hence, efficiency can be enhanced. Furthermore, as there exists no movable construction in each lamp, the construction of the lamps can be simplified, thereby making it possible to reduce the production cists.

Embodiment 2

Figure 6:
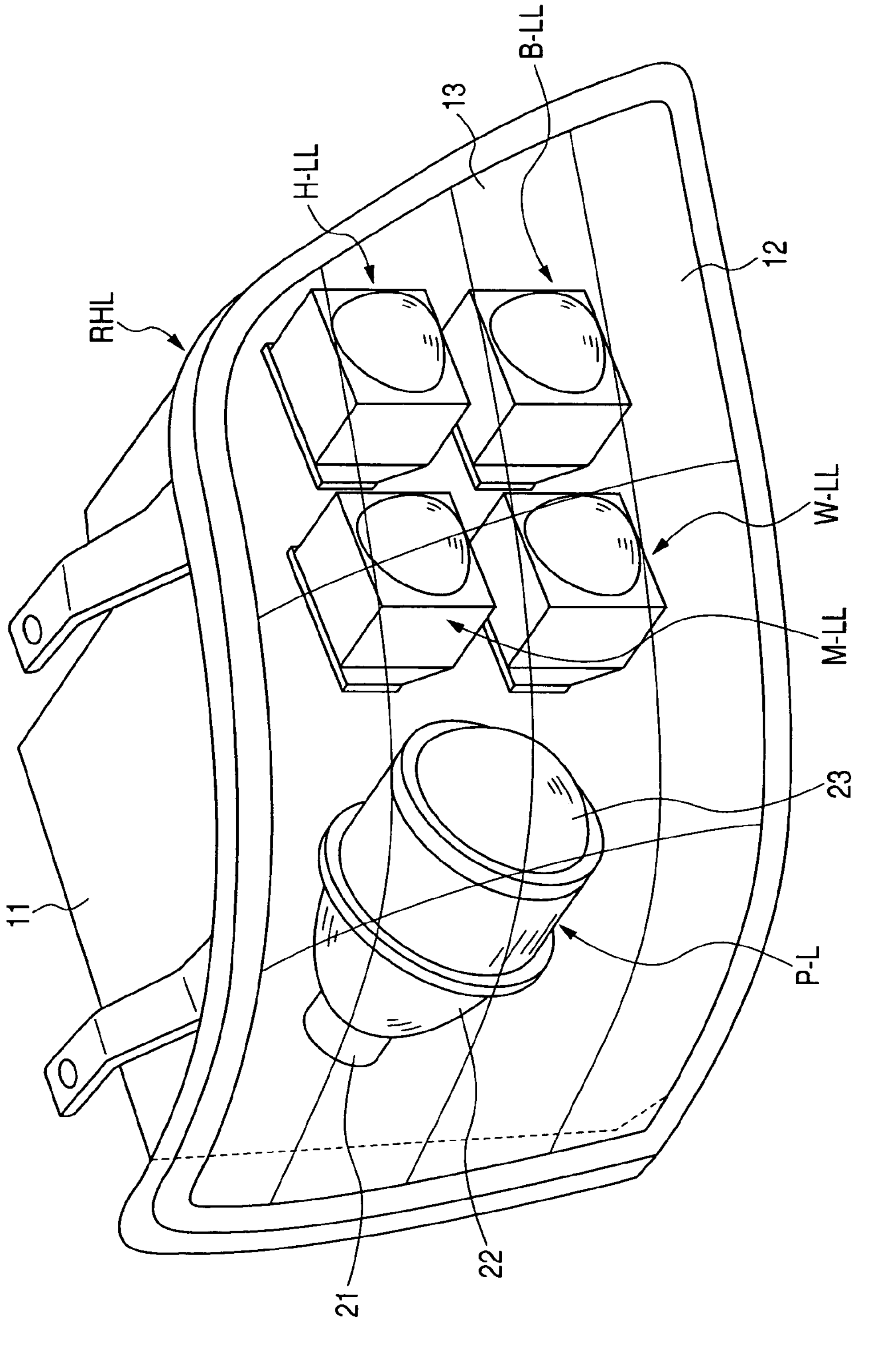
FIG. 6 is a schematic perspective view of a right headlamp of Embodiment 2.

FIG. 6 shows a right headlamp RHL according to Embodiment 2. The first to fifth lamps are installed in a lamp compartment 13 defined by a lamp body 11 and a transparent cover 12 which is mounted in a front opening in the lamp body 11. The first to fourth lamps are similar to those of Embodiment 1. However, one of the two second lamps W-LL in Embodiment 1 corresponds to the second lamp W-LL in Embodiment 2, and the other lamp functions as the fifth lamp B-LL in Embodiment 2, as will be described later on.

Figure 7A:
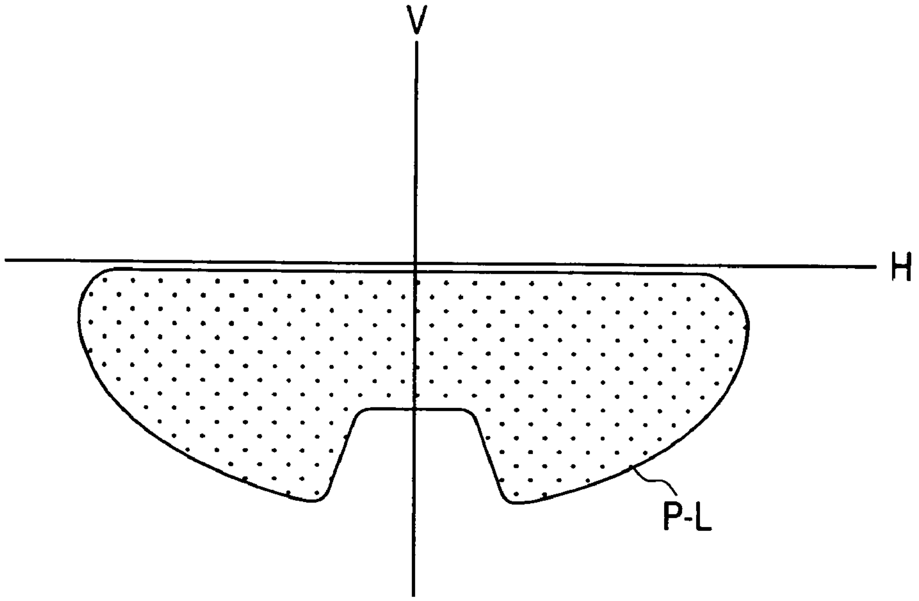
FIGS. 7A and 7B are light distribution characteristic diagrams of constituent lamps of Embodiment 2.
Figure 7B:
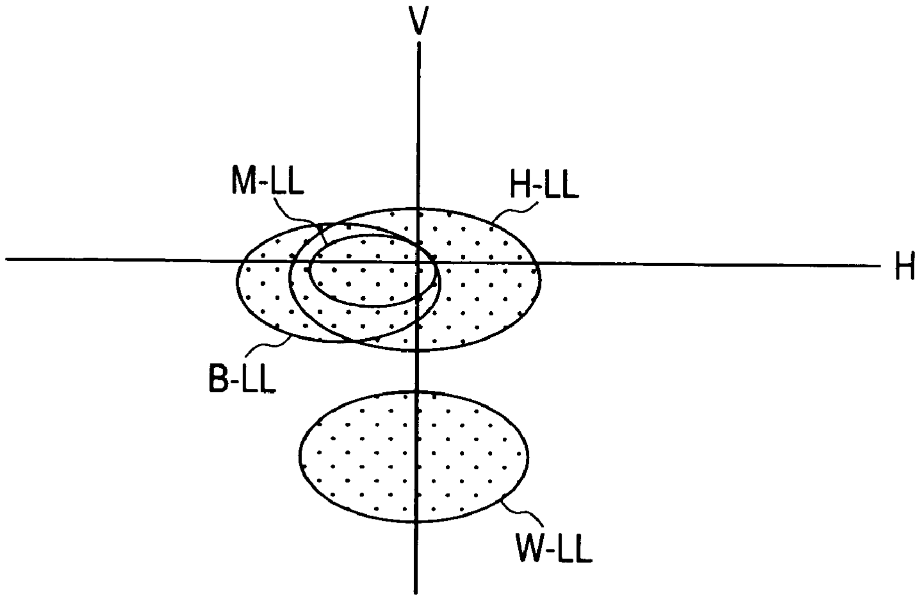

In addition, in Embodiment 2, the shape of the cut-off line forming shade 25 differs from that of Embodiment 1 (see FIG. 3A), and the light distribution characteristic of the first lamp P-L is arranged, as is shown in FIG. 7A, to shield the light which would otherwise irradiate an upper area above the horizontal. The light which irradiates the nearest field area of the vehicle is shielded as in Embodiment 1. In addition, the fifth lamp is designated as a B (basic)-LED lamp and denoted by reference character B-LL. As is shown in FIG. 7B, this fifth lamp B-LL has a light distribution pattern in which a left forward area of the vehicle is irradiated. The second lamp W-LL, third lamp H-LL and fourth lamp M-LL have the same light distribution characteristics as the corresponding lamps of Embodiment 1.

Figure 8A:
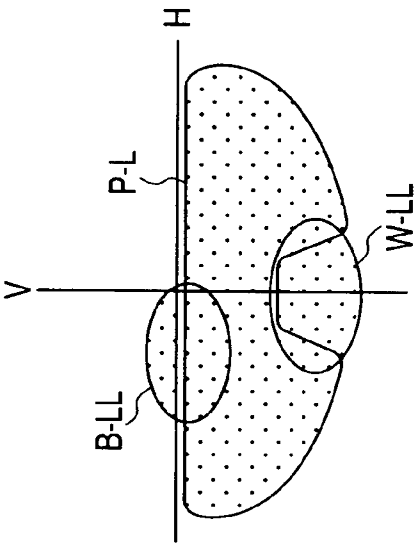
FIGS. 8A to 8D are light distribution characteristic diagrams showing light distribution characteristics according to various driving conditions in Embodiment 2.

Next, respective light distribution characteristics of the individual lamps of Embodiment 2 will be described. The first lamp P-L and the fifth lamp B-LL form a unit which functions as the lamp "for irradiating an area excluding a nearest field area." The second lamp W-LL functions as the lamp "for irradiating only the nearest field area." Lamp modes in Embodiment 2 are the same as those of Embodiment 1. In a "pass-by mode," as is shown in FIG. 8A, the first lamps P-L, the second lamps W-LL and the fifth lamps B-LL are lit. A forward wide area (excluding the nearest field area just in front of the vehicle) is irradiated by the first lamps P-L, the nearest field area just in front of the vehicle is irradiated by the second lamps W-LL, and a left forward area of the vehicle is irradiated by the fifth lamps B-LL. In this light distribution characteristic of the pass-by mode, respective irradiation light beams of the individual lamps are combined together to irradiate all of the direct forward area to the left forward far field area of the vehicle, so as to secure the safe driving without interfering with the vision of the driver of an oncoming vehicle.

Figure 8B:
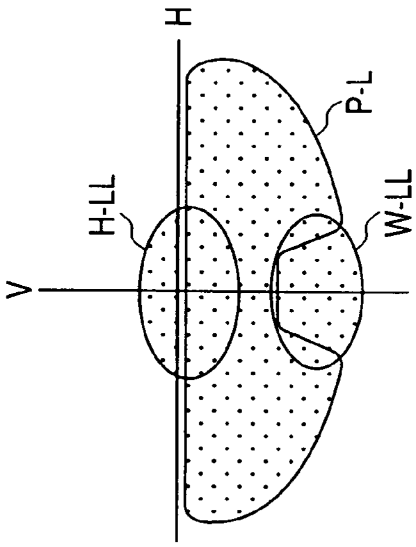

In a "driving mode," as is shown in FIG. 8B, the first lamps P-L, the second lamps W-LL and the third lamps H-LL are lit. The forward wide area (excluding the nearest field area just in front of the vehicle) is irradiated by the first lamps P-L, the nearest field area just in front of the subject vehicle is irradiated by the second lamps W-LL, and a forward far field area of the subject vehicle is irradiated by the third lamps H-LL. In this light distribution characteristic of the driving mode, respective irradiation lights of the individual lamps are combined together to irradiate all of the forward area to left and right forward far field areas of the vehicle, so as to secure safe driving by irradiating the forward wide area expanding to the far field area of the vehicle.

Figure 8C:
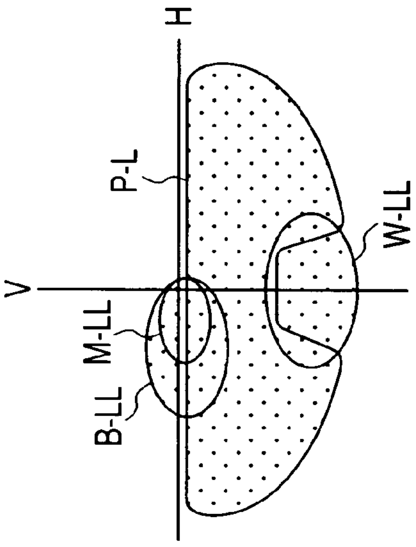

In a "high speed driving mode," as is shown in FIG. 8C, the first lamps P-L, the second lamps W-LL, the fourth lamps M-LL and the fifth lamps B-LL are lit. The forward wide area (excluding the nearest field area just in front of the vehicle) is irradiated by the first lamps P-L, the nearest field area just in front of the subject vehicle is irradiated by the second lamps W-LL, a left forward far field area of the subject vehicle is irradiated by the fourth lamps M-LL, and the left forward area of the subject vehicle is irradiated by the fifth lamps B-LL. In this light distribution characteristic of the high speed driving mode, respective irradiation lights of the individual lamps are combined together to irradiate all of the forward area to the left forward far field area of the vehicle, so as to secure safe driving without interfering with the vision of the driver of an oncoming vehicle when the subject vehicle is moving at relatively high speeds. As this occurs, the second lamps W-LL may be lit so that the amount of light emitted from the light source is reduced. Power savings can be obtained, and visibility in the far field area can be increased.

Figure 8D:
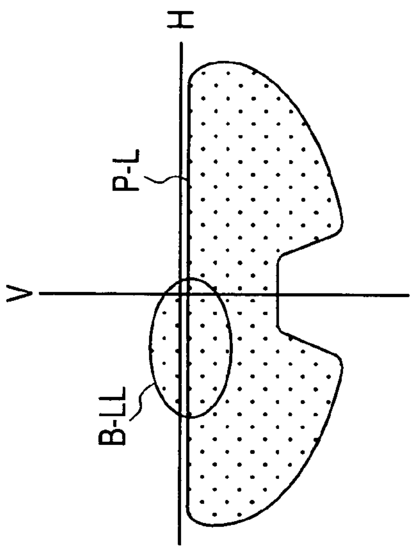

In a "driving-under-the-rainy-weather mode," as is shown in FIG. 8D, the first lamps P-L and the fifth lamps B-LL are lit. The forward wide area (excluding the nearest field area just in front of the vehicle) is irradiated by the first lamps P-L, and the left forward area of the vehicle is irradiated by the fifth lamps B-LL. In this light distribution characteristic of the "driving-under-the-rainy-weather," mode, respective irradiation light beams of the individual lamps are combined together to irradiate the forward area of the vehicle (excluding the nearest field area just in front of the vehicle). Consequently, as the nearest field area is not irradiated while the forward area is irradiated when the vehicle is being driven in rainy weather, light from the headlamps of the vehicle is not reflected on the wed road surface in the nearest field area just in front of the vehicle. Therefore, light which otherwise might interfere with the vision of the driver of an oncoming vehicle is not reflected by the wet road surface. As with Embodiment 1, the second lamps W-LL may be lit so that the light irradiating from them is reduced, depending on the brightness in the surrounding environment.

Also, in Embodiment 2, a suitable light distribution characteristic for each of the different driving modes can be obtained by combining the respective irradiation lights of the first to fifth lamps into an integrated light beam pattern for irradiation. In addition, as the need to shield the emission of light from the light source of each lamp may be reduced, the efficiency of the light source can be enhanced. Furthermore, as there is no movable construction in each lamp, the design can be simplified, thereby making it possible to reduce production costs.

Embodiment 3

Figure 9:
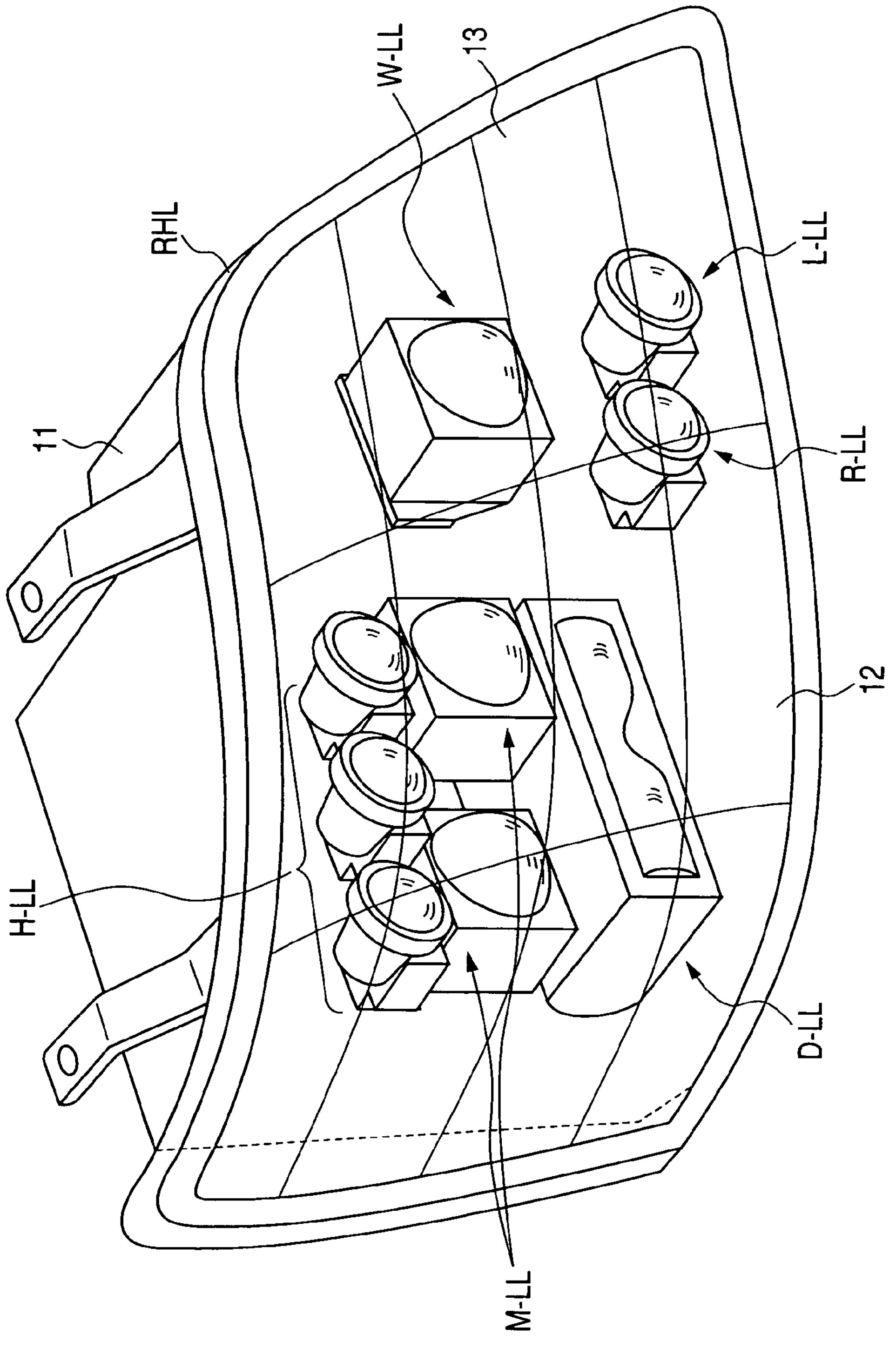
FIG. 9 is a schematic perspective view of a right headlamp of Embodiment 3.

In a lighting system of Embodiment 3, in addition to the respective lamp modes in Embodiment 1, irradiation in an "urban driving mode" and a "corner driving mode" is possible. In Embodiment 3, the headlamp includes first to fourth lamps, and sixth and seventh lamps. These lamps are composed of LED lamps which utilize LED's as their light sources. FIG. 9 is a schematic perspective view of a right headlamp RHL. The configurations of the individual LED lamps differ in the shapes of reflectors and positions where the LED's are provided and, hence, differ in light emitting directions and irradiation ranges. The other features are basically the same.

Figure 10A:
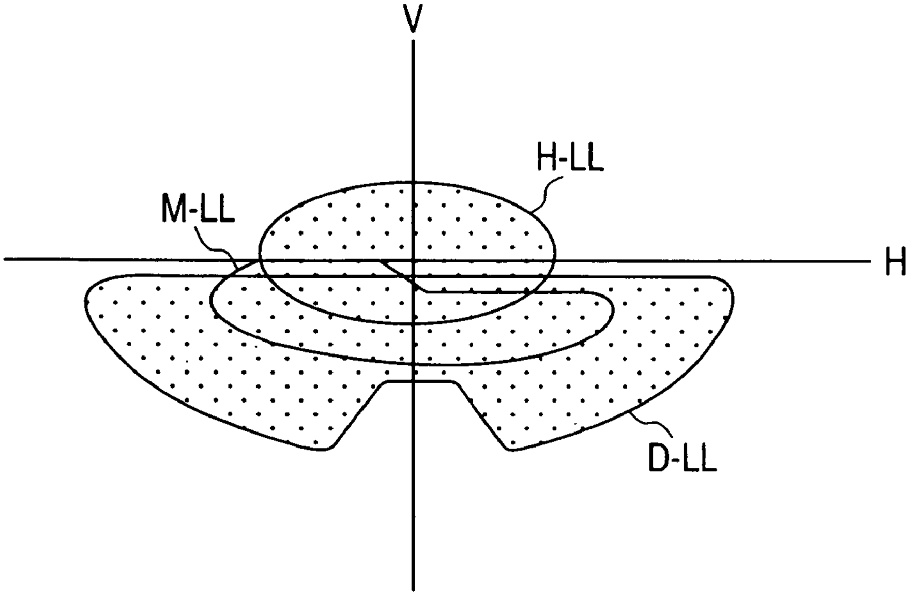
FIGS. 10A and 10B are light distribution characteristic diagrams of constituent lamps of Embodiment 3.

As is seen from the light distribution characteristics shown in FIG. 10A, a first lamp includes a diffusion-type LED lamp (hereinafter, referred to as a "D (deflector)-LED lamp") D-LL having a light distribution characteristic in which a forward wide range lying ahead of the vehicle is irradiated and a left forward area of the vehicle is irradiated in an area lying slightly above the horizontal line. This first lamp D-LL is formed into a horizontally rectangular shape (as seen from the front) in which a reflector with the same sectional configuration as shown in FIG. 3A is extended in the horizontal direction. The foregoing light distribution characteristic can be obtained by this reflector configuration. The headlamp includes, as the fourth lamp, M (middle beam)-LED lamps M-LL provided above the first lamp D-LL which are made up of two LED lamps and are configured to provide a light distribution characteristic as shown in FIG. 10A in which a direct forward area and a left forward area of the vehicle are irradiated. The headlamp further includes, as the third lamp, H (high beam)-LED lamps H-LL disposed horizontally above the fourth lamp which are made up of three LED lamps and are configured to irradiate a forward area in a straight-line traveling direction of the vehicle. The configurations of these fourth lamps M-LL and third lamps H-LL are substantially the same as those of the M-LED lamps M-LL and the H-LED lamp H-LL. Although no light shielding means such as a shade for shielding the light emitted from the light source is provided, the fourth and third lamps provide the light distribution characteristics that have been described above. Here, the light distribution characteristic of the first lamp D-LL is such that an approximately trapezoidal area in a nearest field area just in front of the vehicle is not irradiated. In addition, the first lamp D-LL and the fourth lamps M-LL are installed on a vertical aiming mechanism (not shown in the drawings), so that optical axes of both lamps can be changed slightly in a vertical direction by the vertical aiming mechanism.

Figure 10B:
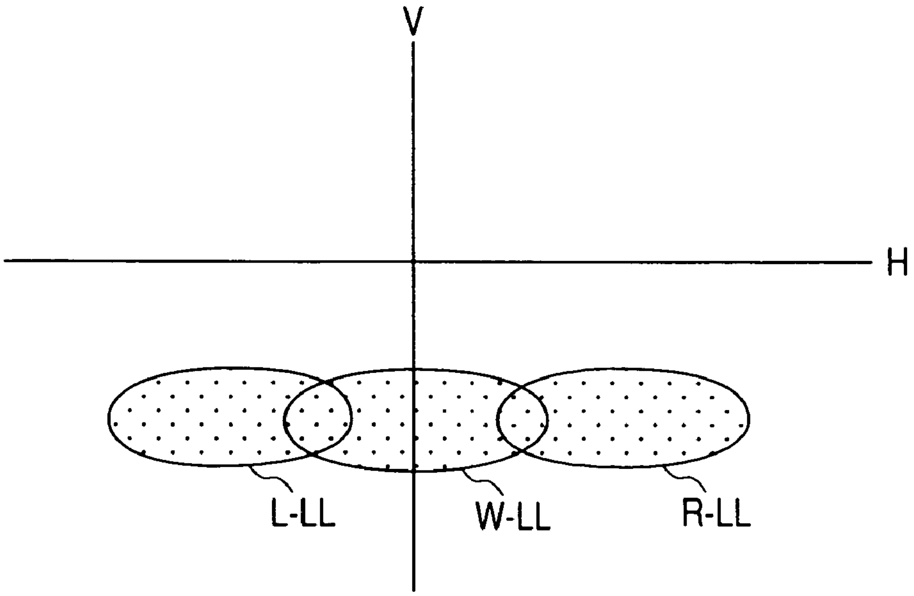

A W (wet road)-LED lamp W-LL as the second lamp, and a R (right)-LED lamp R-LL and a L (left)-LED lamp L-LL as the sixth and seventh lamps have light distribution characteristics as shown in FIG. 10B, and the second lamp W-LL has substantially the same configuration and light distribution characteristic as those of the second lamp W-LL in Embodiment 1, in which a light beam pattern is distributed horizontally across its optical axis even though there is provided no particular light shielding means such as a shade.

Next, a light distribution characteristic of each lamp mode in Embodiment 3 will be described. The first lamp D-LL and the fourth lamps M-LL are combined into one unit which functions as the "lamp for irradiating an area excluding a nearest field area," and the second lamp W-LL functions as the "lamp for irradiating only the nearest field area." In a "pass-by mode," the first lamps D-LL, the second lamps W-LL and the fourth lamps M-LL are lit. FIG. 1A shows the resulting light distribution characteristic in which a forward wide area (excluding the nearest field area just in front of the vehicle) is irradiated by the first lamp D-LL, the nearest field area just in front of the vehicle is irradiated by the second lamps W-LL, and a left forward area of the vehicle is irradiated by the fourth lamps M-LL. As this occurs, optical axes of the first lamp D-LL and the fourth lamps M-LL are directed slightly further downward than the horizontal direction. Respective irradiation lights of the individual lamps are combined together into an integrated light beam pattern so as to irradiate all of the direct forward area to the left forward far field area, thereby making it possible to secure safe driving by irradiating the forward wide area of the vehicle without interfering with the vision of the driver of an oncoming vehicle.

Figure 11A:
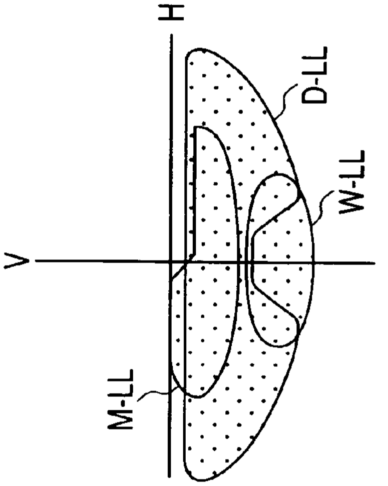
FIGS. 11A to 11F are light distribution characteristic diagrams-showing light distribution characteristics according to various driving conditions in Embodiment 3.
Figure 11B:
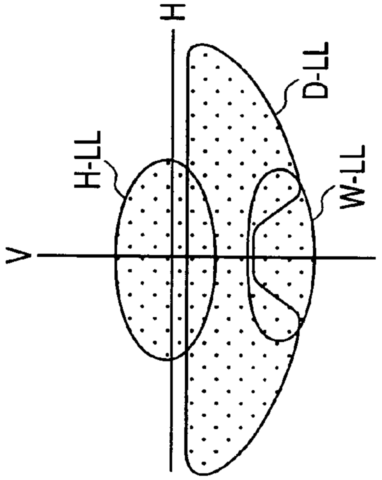

In a "driving mode," the first lamps D-LL, the second lamps W-LL and the third lamps H-LL are lit. FIG. 11B shows the resulting light distribution characteristic, in which the forward wide area (excluding the nearest field area just in front of the vehicle) is irradiated, the nearest field area just in front of the vehicle is irradiated by the second lamps W-LL, and a far field area in a straight-line traveling direction of the vehicle is irradiated by the third lamps H-LL. As this occurs, the optical axis of the first lamp D-LL is directed slightly further downward than the horizontal line. Respective irradiation lights of the individual lamps are combined together into an integrate light beam pattern so as to irradiate all of the direct forward area to left and right forward far field areas, thereby making it possible to secure safe driving by irradiating the forward wide area of the vehicle which expands to the far field area.

Figure 11C:
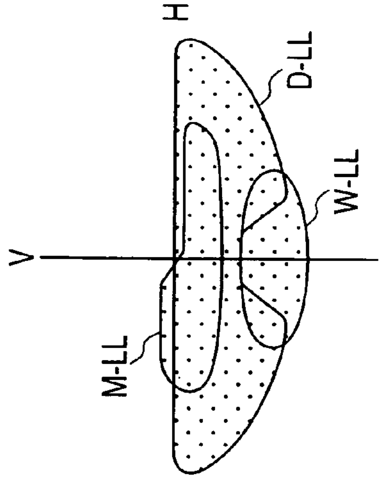

In a "high speed driving mode," the first lamps D-LL, the second lamps W-LL and the fourth lamps M-LL are lit. FIG. 11C shows the resulting light distribution characteristic in which the forward wide area (excluding the nearest field area just in front of the vehicle) is irradiated by the first lamps D-LL, the nearest field area just in front of the vehicle is irradiated by the second lamps W-LL, and the left forward far field area of the vehicle is irradiated by the fourth lamps M-LL. As this occurs, the optical axes of the first lamp D-LL and the fourth lamps M-LL are directed upward in a direction which is very close to a forward direction of the vehicle. Respective irradiation lights of the individual lamps are combined together into an integrated light beam pattern, so as to irradiate all of the direct forward area to the left front far field area of the vehicle, thereby making it possible to secure safe driving without interfering with the vision of the driver of an oncoming vehicle while the subject vehicle is moving at relatively high speeds.

Figure 11D:
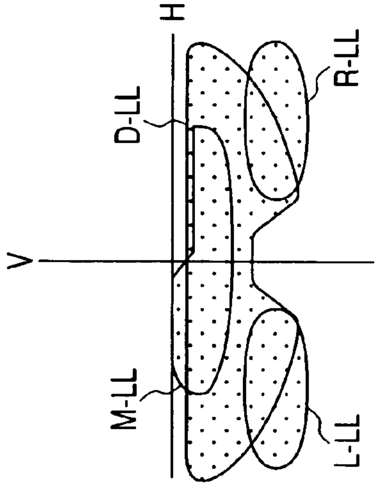

In a "driving-under-the-rainy-weather mode," the first lamps D-LL, the fourth lamps M-LL, the sixth lamps R-LL and the seventh lamps L-LL are lit. FIG. 11D shows the resulting light distribution characteristic in which the forward wide area (excluding the nearest field area just in front of the vehicle) is irradiated by the first lamps D-LL, and the left forward area of the vehicle is irradiated by the fourth lamps M-LL. A right forward area and a left forward area of the vehicle are irradiated by the sixth lamps R-LL and the seventh lamps L-LL, respectively. As this occurs, the second lamps W-LL are not lit. In addition, the optical axes of the first lamp D-LL and the fourth lamps M-LL are directed slightly further downward than the horizontal direction. Respective irradiation lights are combined together into an integrated light beam pattern so as to irradiate the forward area of the vehicle (excluding the nearest field area just in front of the vehicle). Consequently, when the vehicle is driven in rainy weather conditions, as the nearest field area is not irradiated while the forward area of the subject vehicle is irradiated, light from the headlamps of the vehicle is not reflected by the wet road surface in the nearest field area just in front of the subject vehicle. Therefore, light that would otherwise be reflected by the wet road surface does not interfere with the vision of the driver of an oncoming vehicle. In addition, as the left and right areas to the nearest field area just in front of the subject vehicle are irradiated by the sixth lamps R-LL and the seventh lamps L-LL, respectively, the nearest field area just in front of the subject vehicle does not becomes totally dark. Furthermore, even when the speed of the subject vehicle is increased to high speeds, the irradiation of the left forward far field area of the subject vehicle is secured by the fourth lamps M-LL.

Figure 11E:
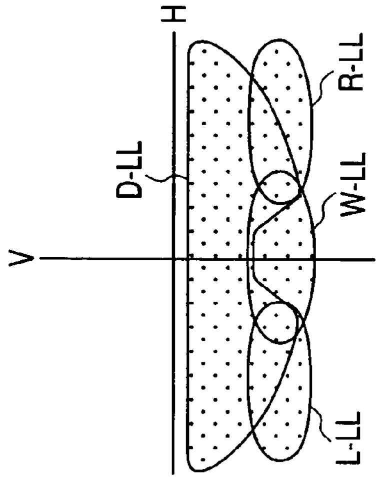

In an "urban driving mode," the first lamps D-LL, the second lamps w-LL, the sixth lamps R-LL and the seventh lamps L-LL are lit. FIG. 11E shows the resulting light distribution characteristic in which the forward wide area excluding the nearest field area just in front of the vehicle is irradiated by the first lamps D-LL, the nearest field area just in front of the vehicle is irradiated by the second lamps W-LL, and the right forward area and the left forward area of the vehicle are irradiated by the sixth lamps R-LL and the seventh lamps L-LL, respectively. As this occurs, the optical axis of the first lamp D-LL is directed slightly further downward than the horizontal direction. Respective irradiation lights of the individual lamps are combined together into an integrated light beam pattern so as to irradiate the forward area of the vehicle. In particular, as the nearest field area and the right and left nearest field areas of the vehicle are irradiated by the second lamps W-LL, the sixth lamps R-LL and the seventh lamps L-LL, respectively, safe driving is secured in an urban area where vehicles tend to be driven at low to intermediate speeds and there are many bicycles and pedestrians on roads.

Figure 11F:
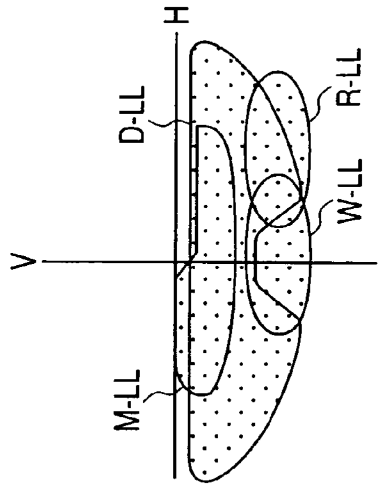

In a "corner driving mode," the first lamps D-LL, the second lamps W-LL and either of the sixth lamps R-LL or the seventh lamps L-LL are lit. Furthermore, the fourth lamps M-LL are lit depending on the speed of the vehicle. In addition, the sixth lamps R-LL and the seventh lamps L-LL are selectively lit depending on the steering direction of the vehicle. FIG. 11F shows a light distribution characteristic which results when the fourth lamps M-LL are lit when the speed of the subject vehicle has reached intermediate speeds or faster and the sixth lamps R-LL are lit when the subject vehicle is steered toward the right. The forward wide area (excluding the nearest field area just in front of the vehicle) is irradiated by the first lamps D-LL, the nearest field area just in front of the vehicle is irradiated by the second lamps W-LL, and the right forward area of the vehicle is irradiated by the sixth lamps R-LL. As this occurs, the first lamps D-LL and the fourth lamps M-LL are directed slightly further downward than the horizontal direction. Respective irradiation lights are combined together into an integrated light beam pattern so as to irradiate the right nearest field area lying in a direction toward which the vehicle is traveling as well as the forward area lying in the straight-line traveling direction of the vehicle. This makes it possible to secure safe driving when the vehicle is cornering. When the vehicle is steered toward the left, the seventh lamps L-LL are lit to irradiate the left nearest field area of the vehicle.

A suitable light distribution characteristic for each of the different driving modes can be obtained by combining the irradiation lights of the various LED lamps which make up the first to fourth lamps, and the sixth and seventh lamps, respectively. In addition, in the individual LED lamps, as the light emitted from the light sources is not shielded when the LED lamps are lit, all the irradiation lights can be used to irradiate the forward area of the vehicle. Therefore, the irradiation efficiency of the headlamp can be enhanced. Furthermore, as there is no light shielding means having a movable construction in each of the LED lamps, the construction of the lamp can be simplified, thereby making it possible to reduce production costs.

In Embodiments 1 to 3 described above, the invention is described as being applied to left-hand side traffic in which oncoming vehicles travel on the right-hand side of the subject vehicle. The invention also can be applied to a right-hand side traffic, in which case the optical axis of the light distribution characteristic of the fourth lamp M-LL is directed to the right.

Also, in Embodiment 3, when the subject vehicle is traveling in rainy weather, the light distribution characteristic may be adopted in which the light irradiated from the second lamp W-LL is reduced so as to reduce the brightness in the nearest field area.

The plurality of lamps may be of any type including discharge lamps, LED lamps and incandescent lamps, provided that the lamps can be selectively lit so that respective irradiation lights of the individual lamps can be combined together into an integrated irradiation light pattern for irradiation. Hence, the invention is not limited to the particular configurations of Embodiments 1 to 3. For example, the LED lamp may include a projector-type lamp or parabolic cylinder glass reflector lamp. In addition, the individual lamp units may be linked to the steering (turning the steering road wheels) of the vehicle so that they can be swiveled accordingly. Furthermore, the first to seventh lamps described in Embodiments 1 to 3 are not necessarily configured as the independent lamps, but may be configured into a combination lamp in which multiple lamps are integrated while allowed to be lit independently, or a unitized lamp.

Various changes and modification may be made to the embodiments described above without departing from the present invention. Other implementations are within the scope of the claims.

What is claimed is:

1. A vehicle lighting system comprising:

a plurality of lamps having their own respective inherent light distribution characteristics, wherein the plurality of lamps comprises:

a first lamp to irradiate a first portion of a low beam light distribution pattern excluding a nearest field area just in front of a vehicle; and a second lamp to irradiate a second portion of the low beam light distribution pattern primarily including the nearest field area, wherein the plurality of lamps are operable to be selectively lit, and wherein the first and second lamps are operable to be selectively lit in combination so as to obtain a combined light distribution pattern.

2. The vehicle lighting system according to claim 1, wherein the second lamp is operable to irradiate the nearest field area with reduced light.

3. The vehicle lighting system according to claim 2, wherein the first lamp includes a discharge lamp or a semiconductor light emitting device as a light source, and the second lamp includes a semiconductor light emitting device as a light source.

4. The vehicle lighting system according to claim 1, wherein the first lamp includes a discharge lamp or a semiconductor light emitting device as a light source, and the second lamp includes a semiconductor light emitting device as a light source.

5. The vehicle lighting system according to claim 1, wherein the plurality of lamps are operable to be lit selectively so that irradiation lights of the lamps are combined to obtain a particular light distribution characteristic in accordance with driving conditions.

6. The vehicle lighting system according to claim 5, wherein the second lamp is operable to emit either no light or a reduced amount of light in accordance with a rainy weather driving condition.

7. The vehicle lighting system according to claim 1, wherein the plurality of lamps further comprises a third lamp to irradiate a far field area in a traveling direction of the vehicle, the far field area including a region above the area to be irradiated by the first lamp, and wherein the first, second and third lamps are operable to be selectively lit in combination so as to obtain another combined light distribution pattern.

8. The vehicle lighting system according to claim 1, wherein the first lamp comprises a light source and an auxiliary reflector to reflect light away from the nearest field area.

9. The vehicle lighting system according to claim 8, wherein the first lamp comprises a reflector to reflect light ahead of the vehicle and a shade for shielding light irradiated by the light source.

10. The vehicle lighting system according to claim 1, wherein the first and second lamps are operable to be lit in a first low beam configuration, wherein only the first lamp emits light, or a second low beam configuration, wherein both the first and second lamps emit light.

* * * * *